United States Patent [19]

Bloom

[11] 3,857,291
[45] Dec. 31, 1974

[54] SPEED RESPONSIVE GOVERNOR MECHANISMS

[75] Inventor: Joseph Louis Bloom, Droitwich, England

[73] Assignee: Joseph Lucas (Industries) Limited, Birmingham, England

[22] Filed: Aug. 4, 1972

[21] Appl. No.: 278,011

[30] Foreign Application Priority Data
Aug. 4, 1971 Great Britain............... 36625/71

[52] U.S. Cl. ................................. 73/541, 73/543
[51] Int. Cl. ......................................... G05d 13/26
[58] Field of Search ............ 73/509, 534, 535, 540, 73/541, 543; 60/39.28 R, 39.28 T

[56] References Cited
UNITED STATES PATENTS
3,550,374 12/1970 Bloom............................ 60/39.28 R Primary Examiner—James J. Gill
Attorney, Agent, or Firm—Holman & Stern

[57] ABSTRACT

A speed-responsive governor mechanism comprises a rotatable governor arrangement having an output member responsive to the speed of a shaft driving the governor arrangement.

A lever has one end engaging the output member and has a cam surface at its other end. A further lever also has a cam surface which is opposed to the first mentioned cam surface. The cam surfaces are urged apart by a spring-loaded device which is rotatably mounted between them. The device has a pair of lever arms whch are biased outwardly by a tension spring and which engage the respective cam surfaces so that the force exerted by the first mentioned lever is dependent on the output position of the spring-loaded device.

4 Claims, 2 Drawing Figures

SPEED RESPONSIVE GOVERNOR MECHANISMS

This invention relates to speed-responsive governor mechanisms and has as an object to provide such a mechanism in a convenient form.

According to the invention a speed-responsive governor mechanism comprises a body, a governor arrangement rotatable within the body and including an output member, a first lever pivotally mounted on the body and movable by the output member in response to changes in the speed of a shaft which provides a drive for the governor arrangement, said first lever having thereon a cam surface, a second lever having a cam surface spaced from, and directed towards, the cam surface on the first lever, means for varying the position of the second lever to move the cam surface thereon relative to the cam surface on the first lever, a member angularly movable with respect to the pivotal axis of the first lever, third and fourth levers pivotally mounted on the said member, a tension spring engaging one end of each of said third and fourth levers, the other ends of said third and fourth levers being biased by said spring towards the cam surfaces of said first and second levers respectively to urge the latter apart, movement of said angularly movable member varying the moment of the force of the spring on the first lever.

Figure 1:
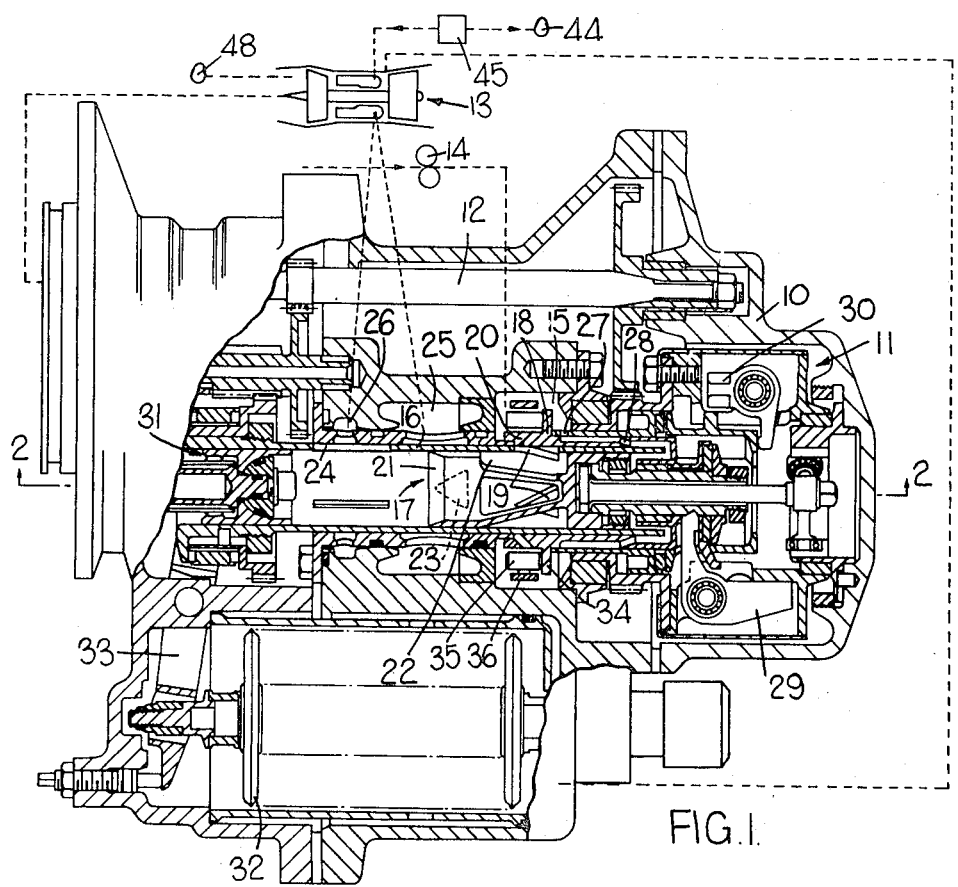
Figure 2:
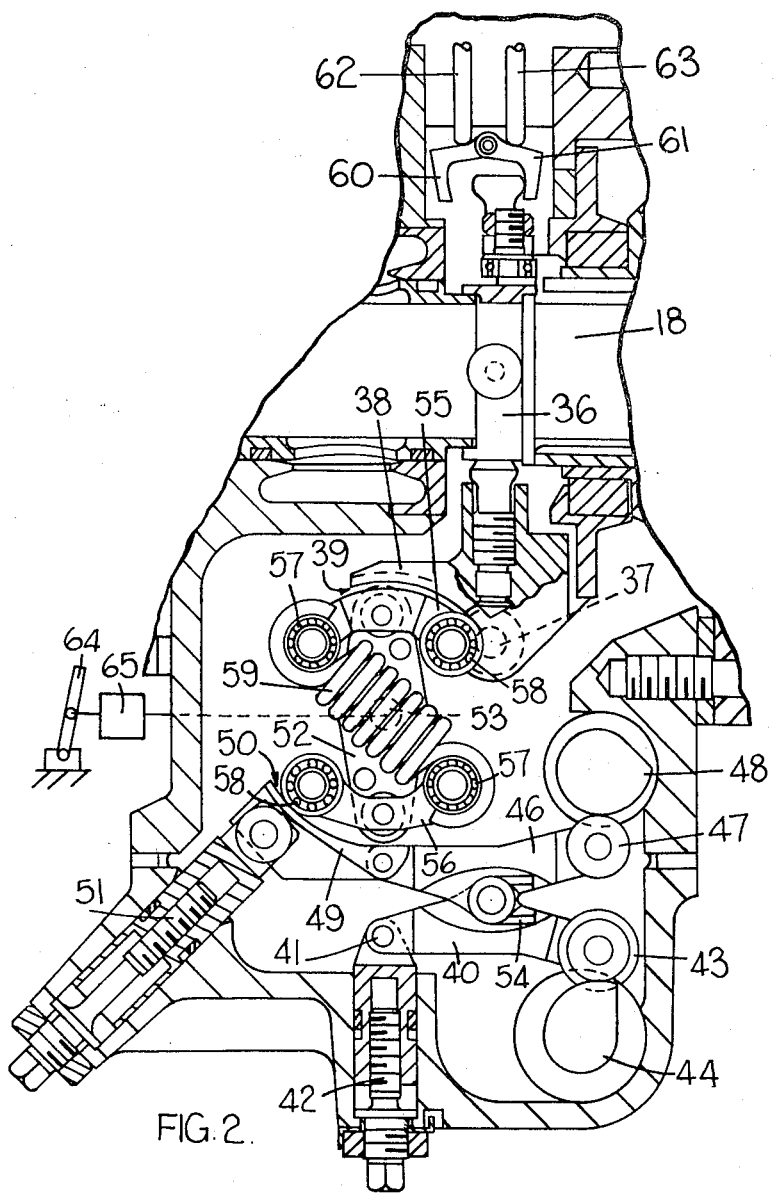

The invention will now be described with reference to the accompanying drawings in which:

FIG. 1 is a section through a fuel control apparatus for a gas turbine engine and incorporating a mechanism according to the invention, and FIG. 2 is a scrap section on line 2—2 in FIG. 1

In the apparatus shown a casing 10 contains a speed responsive governor arrangement 11 driven, via shaft 12, by the shaft of a gas turbine engine 13. Also driven by the engine 13 is a pump 14 which supplies fuel to a space 15 within the casing 10.

Slidable within casing 10 is a sleeve 16, and slidable within sleeve 16 is a piston closure member 17. Surrounding one end of sleeve 16 and also slidable in the casing 10 is a further sleeve 18. Extending through the walls of sleeve 16, 18 are respective ports 19, 20 which combine to define a variable metering orifice whose size is dependent on the relative axial positions of sleeves 16, 18. Closure member 17 includes a hollow cylindrical portion 21 having cut-outs 22 by means of which the said variable metering orifice communicates with the bore of sleeve 16. The wall of sleeve 16 has further ports 23, 24 which are spaced axially from each other and from the ports 19. Port 23 communicates with an annular space 25 in casing 10, space 25 communicating with the main burners of the engine 13.

The end of member 17 combines with port 23 to control flow from the bore of sleeve 16 to engine 13 in accordance with the relative axial positions of members 17 and sleeve 16. Ports 24 communicate via an annular space 26 in casing 10 with primary burners for the engine 13.

Space 15 communicates via passages 27, 28 with the side of piston closure member 17 remote from the variable metering orifice. Member 17 is thus subjected to the pressure difference across the said variable metering orifice. Governor arrangement 11 includes weights 29 movable in response to an increase in the speed of engine 13 to urge member 17 in a direction to oppose the metering orifice pressure difference.

Governor arrangement 11 also includes weights 30 movable in response to an increase in engine speed to urge sleeve 18 to the left, as seen in FIG. 1.

Sleeve 16 is rotatable within casing 10 by shaft 12 via gears 31. Sleeve 16 is also axially slidable by a bellows 32 subjected internally to the compressor delivery pressure of engine 13, bellows 32 acting on sleeve 16 via a linkage 33.

Sleeve 18 has projections 34 engaged by rollers 35 carried by a forked lever 36 mounted in the casing 10 for movement about a pivot 37. Lever 38 is formed with a cam surface 39. A lever 40 is mounted for movement about a pivot 41 whose position is adjustable by means of a threaded stem 42. The end of lever 40 remote from pivot 41 carries a roller 43 engaging a cam 44 rotatable in response to a control 45 by means of which a water/methanol mixture is supplied to the combustion chambers of the engine 13.

Pivotally mounted on lever 40 intermediate the ends thereof is a lever 46. One end of lever 46 carries a roller 47 engaging a cam 48 rotatable by a signal dependent of the temperature within the jet pipe of engine 13. Rollers 43, 47 are biased apart and into engagement with the respective cams 44, 48 by a torsion spring 54. The end of lever 46, on the opposite side of the pivot thereof, pivotally supports a fourth lever 49. Lever 49 has a cam surface 50 directed towards cam surface 39. Lever 49 is movable about its pivot by a threaded stem 51.

A member 52 is mounted between levers 38, 49 for movement about an axis 53. Pivotally mounted at opposite ends of member 52 are rocker arms 55, 56. The respective ends of each of arms 55, 56 carrying ball bearing assemblies 57, 58. Bearing assemblies 58 engage the respective cam faces 39, 50. A tension spring 59 has its ends engaged around the bearing assemblies 57 to bias the latter towards one another, and hence assemblies 58 in directions to urge the cam faces 39, 50 apart.

A pair of stops 60, 61 are pivotally mounted in the casing 10 and have their positions adjustable by respective stems 62, 63 to limit the pivotal movement of lever 36.

In use, a desired engine speed is selected by means of a lever 64 connected to member 52 via a linkage arrangement (shown generally at 65), whereby response of member 52 to movement of lever 64 in either direction from a neutral position is in accordance with desired parameters. Fuel supply to the main burners of engine 13 is dependent on flow through the metering orifice defined by ports 19, 20. For a given axial position of sleeve 16, flow through the metering orifice thus depends on the position of sleeve 18. Sleeve 18 is urged by governor weight 30 in a direction to reduce fuel flow as engine speeds increases, and in the opposite direction by the bias applied to lever 36 by spring 59. Rotation of member 52 in an anticlockwise direction as seen in FIG. 2, increases the moment of the force exerted by spring 59 on lever 36. This clockwise movement thus has the effect that, for a given speed of rotation of shaft 12, sleeve 18 adopts an equilibrium position which is to the right of its intial equilibrium position, thereby allowing an increase flow to the engine 13.

The provision of cam surfaces 39, 50 has the effect that the rate of fuel flow with respect to the angular position of member 52 is not necessarily linear, but follows a desired curve. Moreover, the position of cam surface 50 with respect to surface 39 may be adjusted by threaded stem 51, and for given positions of cams 44, 48, by stem 42. Stems 42, 51 are adjusted initially and not thereafter normally moved. Cams 44, 48 are rotated, as above described, in accordance with engine operating parameters and also, by moving cam face 50 relative to cam face 38 modify the moment of the force of spring 59 on lever 36, for given positions of member 52.

The provision of a tension spring on member 52, together with bearing assemblies 57, 58 has the effect that, in comparison with known arrangements, friction forces are significantly reduced between member 52 and lever 36. Reduction in static friction reduces hysteresis between movement of lever 64 and the response of sleeve 18 to vary fuel flow.

I claim:

1. A speed-responsive governor mechansim comprising a body, a governor arrangement rotatable within the body and including an output member a first lever pivotally mounted on the body and movable by the output member in response to changes in the speed of a shaft which provides a drive for the governor arrangment, said first lever having thereon a cam surface, a second lever having a cam surface spaced from, and directed towards, the cam surface on the first lever, means for varying the position of the second lever to move the cam surface thereon relative to the cam surface on the first lever, a member angularly movable with respect to the pivotal axis of the first lever, third and fourth levers pivotally mounted on the said member, a tension spring engaging one end of each of said third and fourth levers, the other ends of said third and fourther levers being biased by said spring towards the cam surfaces of said first and second levers respectively to urge the latter apart, movement of said angularly movable member varying the moment of the force of the spring on the first lever.

2. A mechanism as claimed in claim 1 in which said angularly movable member is mounted for movement about an axis which lies between the cam surfaces of said first and second levers.

3. A mechanism as claimed in claim 1 which includes rollers at said other ends of said third and fourth levers, said rollers engaging said cam surfaces respectively.

4. A mechanism as claimed in claim 1 in which said third and fourth levers include rollers at said one ends respectively, said spring engaging said rollers.

* * * * *